Patented May 16, 1950

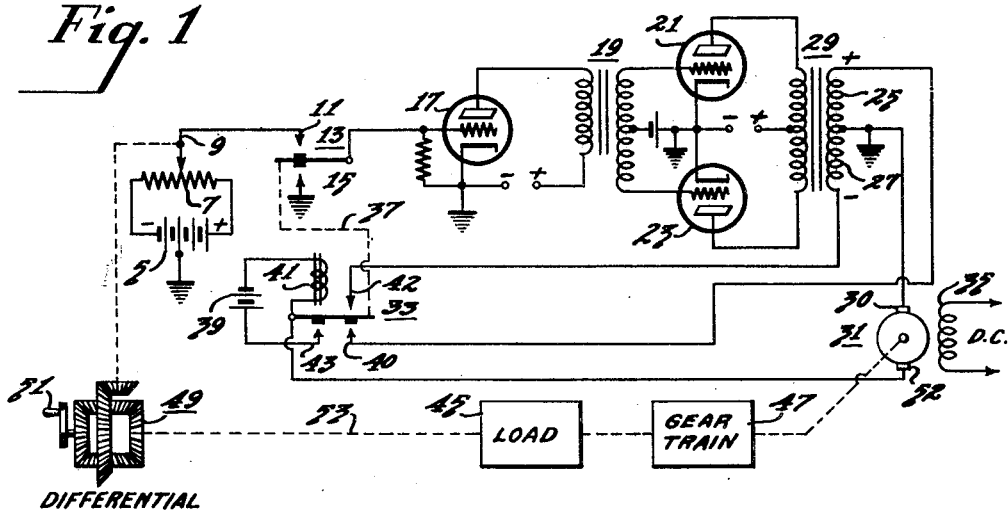
Fig. 1
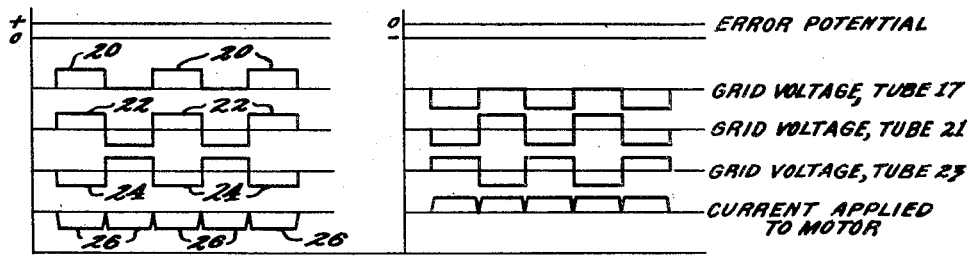
Fig. 2a  Fig. 2b
Fig. 3
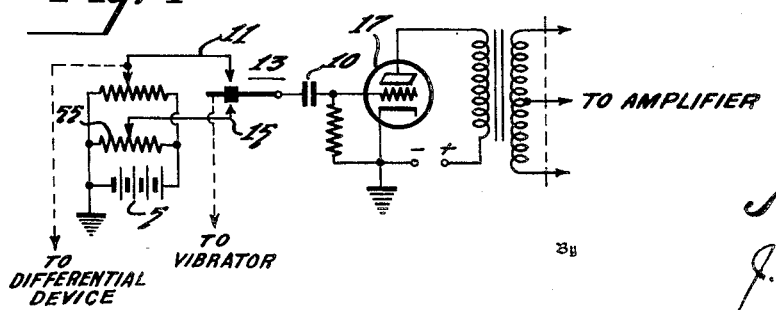
Fig. 4
Inventor
Sidney Wald
Attorney

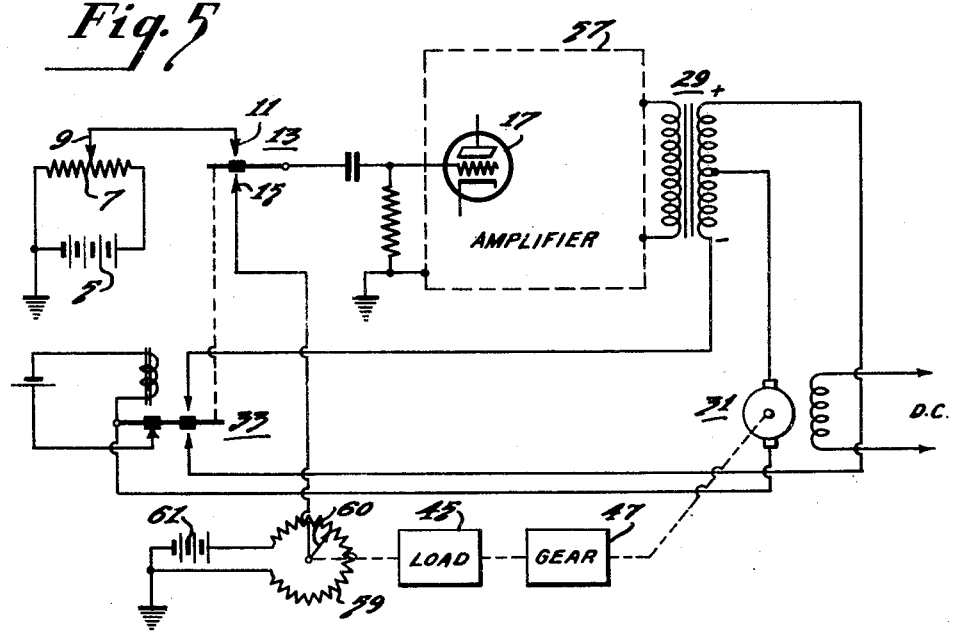
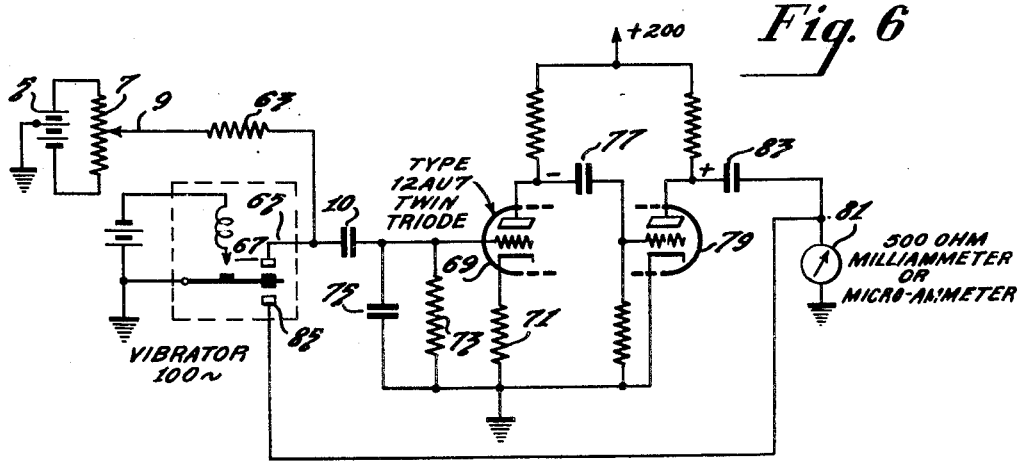

2,508,082

UNITED STATES PATENT OFFICE 2,508,082

REMOTE CONTROL SYSTEM FOR DIRECT-CURRENT MOTORS

Sidney Wald, Collingswood, N. J., assignor to Radio Corporation of America, a corporation of Delaware Application December 11, 1947, Serial No. 791,121

4 Claims. (Cl. 318—257)

This invention relates to remote control systems for D. C. motors and particularly to an arrangement for controlling the speed and direction of rotation of the D. C. motor in response to a D. C. potential which employs an amplifier responsive only to A. C. currents for generating a motor current of sufficient intensity to drive a load device connected to the motor.

The present invention is applicable to remote control systems of the follow-up or of the servo type. The term "follow-up" herein denotes remote control arrangements in which the energizing force applied to the output device is controlled by means of a control element which develops a D. C. potential variable in amplitude and polarity with respect to a reference potential. The term "servo" refers to a position control system having a differential device for comparing the condition or position of the control element with the position of the output device in such a manner that any change from an initially balanced condition causes a movement of the output device in such a direction as to restore the initial condition of balance.

There are many instances where, due to the nature of the source of electrical power available, it is desirable to operate follow-up or servo systems entirely from direct current. In order to convert the small control voltage to a current of sufficient intensity to drive the output motor, it is necessary to provide means for amplifying the control voltage. Direct current amplifiers have sometimes been employed for this purpose. However, such amplifiers are unstable, are usually subject to wide variations in gain due to changes in the amplitude of the D. C. potential from which they are operated, and involve complicated circuits or excessively high voltages. It is the primary object of this invention to provide a control system which produces a direct current suitable for driving a D. C. motor under the control of a small D. C. voltage and which employs a vacuum tube amplifier of conventional design responsive only to alternating currents.

Remote control systems have been suggested previously in which alternating currents of reversing phase and variable amplitude drive an alternating current amplifier which includes rectifier tubes for causing a unidirectional pulsating current to flow through one or the other of two field windings of a D. C. motor. Systems of this type have the disadvantage that they require a special D. C. motor having two field windings, one for each direction of rotation, and that the selective control of rotation thereby accomplished utilizes at any given time only one of the two rectifier tubes required where half-wave rectification is employed, or two of the four rectifier tubes required where full-wave rectification is employed. It is thus necessary to provide in the motor and in the rectifier components which are used alternatively, thus increasing the cost and size of the apparatus in a manner which is undesirable. The present invention contemplates use of the system on small aircraft where considerations of size and weight are most important. It is, therefore, a further object of this invention to overcome the disadvantages of previously known systems, by providing an amplifier-rectifier circuit in which full-wave rectification is accomplished with only two vacuum tubes, both of which are utilized continuously, although the direction of rotation of a single winding D. C. motor may be controlled.

It is a further object of this invention to provide a control system for D. C. motors having a single field or armature winding and in which the direction of rotation is controlled by reversing the direction of the D. C. current flowing through this winding.

In brief, the above objects are accomplished by providing a control element which produces a small D. C. potential variable in amplitude, that is, magnitude, and in polarity with respect to a reference potential and applying the D. C. potential and the reference potential cyclically and alternately to the grid of an amplifier tube to produce a square wave alternating current whose phase reverses 180° in accordance with the relative polarities of the two potentials. The alternating current so produced is amplified by an alternating current amplifier. Output currents (A. C.) are produced by this amplifier which are then rectified synchronously with the cyclic switching of the input potential to produce a unipotential control current whose potential or direction is dependent upon the polarity of the D. C. potential with respect to the reference potential, and whose amplitude is proportional to their relative amplitudes. The synchronous switching of the input potential and rectification of the output current is preferably accomplished by a small synchronous vibrator which may be of the type commonly used in automobile radio receivers having the necessary contacts, electrically isolated, for accomplishing the desired result.

In accordance with an alternative embodiment of this invention, synchronous switching and rectification is accomplished with a simple single-pole double-throw vibrator.

It is a further object of this invention to provide an improved D. C. operated remote control system.

A still further object of this invention is to provide an improved D. C. operated servo system.

The novel features that are considered characteristic of this invention are set forth with particularity in the appended claims. The invention, both as to its organization and method of operation, as well as additional objects and advantages thereof, will best be understood from the following description when read in connection with the accompanying drawings, in which Figure 1 is a circuit diagram of a preferred embodiment of the invention;

Figures 2a, 2b and 3 are curves useful in understanding the operation of the invention;

Figure 4 is the circuit diagram of an alternative form of a portion of the arrangement shown in Fig. 1; and Figures 5 and 6 are circuit diagrams of alternate forms of the invention.

Referring to Fig. 1, a battery 5 having its center point grounded is connected across the terminals of a potentiometer 7, the movable arm 9 of which is connected to one fixed contact 11 of a switch 13, the other fixed contact 15 being grounded. Switch 13 is a single-pole double-throw switch, the movable contact element of which is connected directly or capacitively coupled to the grid of a first amplifier tube 17. The output of amplifier tube 17 is applied through transformer 19 to the grid electrodes of push-pull connected amplifier tubes 21 and 23.

The output of the amplifier tubes 21 and 23 is available at the push-pull secondary windings 25 and 27 of output transformer 29. The common center tap of the secondary windings is grounded, as is one terminal 30 of the armature of a D. C. motor 31. The remaining terminals of secondaries 25 and 27 are connected, respectively, to the two fixed contacts 40 and 42 of a second single-pole double-throw switch 33, the movable contact arm of which is connected to the other armature terminal 32 of motor 31. The field winding 35 of the D. C. motor 31 is connected to a suitable source of D. C. current, or a permanent magnet type of motor may be employed.

In order to provide synchronous operation of the first switch 13 and the second switch 33, the two movable contacts, which may be vibrating reeds, are mechanically connected as indicated by dotted lines 37. The switches may be driven by any suitable means, for example, by means of a battery 39 connected across a solenoid 41 through a switch 43 which makes contact with the vibrating reed in the manner of a D. C. buzzer, as is well known. The frequency of operation is not critical so long as it is within the response frequency range of the amplifier. A frequency of 100 C. P. S. is suitable. It will be understood that the contacts 13, 15, 40 and 42 may cooperate with suitable vibrating contacts insulatingly mounted on a single vibrating element. In such case the functions of switches 13 and 33 will be performed by an equivalent vibrating double-pole double-throw switch. The shaft of motor 31 may be connected to a load device 45 through a suitable gear train 47.

The device described so far may be used as a remote control device of the follow-up type for controlling the torque developed by the motor, and hence the movement of the load, as a function of the amplitude and polarity of the control potential with respect to a fixed reference potential. In the case illustrated, the reference potential is ground potential, but it is to be understood that the term "reference potential" includes positive or negative potentials as well as ground or zero potential.

It may be seen that if the movable contact 9 is adjusted manually or by any controlling device, so that the potential applied to contact 11 is zero with respect to ground, the operation of the first switch 13 in moving between the two fixed contact points 11 and 15 will not affect the voltage of the grid of the first amplifier tube 17. If, however, contact arm 9 is moved slightly to the right, terminal 11 will become positive with respect to the reference potential, that is, with respect to ground, and each time the switch arm moves upwardly a positive pulse 20 will be applied to the grid of the input tube. This operation is illustrated in Fig. 2a in which the cyclic variation of grid potential is illustrated for the condition stated.

The amplifier employed is a conventional audio frequency amplifier having sufficient bandwidth to pass the fundamental frequency of the input voltage, 100 C. P. S. for the case illustrated, plus sufficient harmonic frequencies to insure substantially faithful amplification of the square wave input voltage. A range up to 5000 C. P. S. will be satisfactory, for example. The square wave input voltage is amplified as much as is necessary to drive the output device employed. A single-ended or a push-pull amplifier may be employed as desired, although the latter is preferred as greater efficiency can be obtained.

It may be observed that when the control potential is positive and the first switch, 13, is in contact with the fixed contact 11, the upper terminal of the secondary of the output transformer 29 will be positive with respect to ground while the lower terminal will be negative with respect to ground. At the same instant the second switch, 33, connects the armature of generator 31 across the lower portion of the output transformer secondary. This will cause a current to flow downwardly from the center tap through the armature and the second switch 33 and back to the lower terminal of the transformer.

During the next half cycle of operation, when the contact arms of the two switches 13 and 33 are in the downward position, it will be seen from Fig. 2a that the instantaneous polarity of the alternating voltage is reversed. At this instant the armature is connected to the upper terminal of the secondary of the output terminal, which now is negative. Consequently, current now flows in the same direction from the center tap of the secondary through the armature of the motor to the upper terminal of the transformer. Thus a unipotential current 26 (Fig. 2a) flows through the motor, tending to drive it in a given direction. It will also be noted that the average amplitude of this current is proportional to the amplitude of the control potential with respect to the reference potential, and is practically equal to the peak value of the rectangular pulse output. Thus the torque developed by the motor, and hence its speed, may be controlled by applying a control potential of greater or less amplitude to the amplifier input.

In case the movable contact 9 is moved to the left to produce a control potential which is negative with respect to the reference potential, that is, with respect to ground, the condition will be as illustrated in Fig. 2b. In this case the second switch, 33, will connect the motor armature to the secondary terminal which is positive in each case and the resultant unidirectional current will flow in the opposite direction through the armature of the motor. Thus its direction of rotation will be reversed and, as before, the torque produced, or its speed of rotation, can be controlled by means of the amplitude of the control potential.

The maintenance of synchronous switching of the input voltage and the output current requires substantial elimination of phase-shift through the amplifier. The use of a square wave control voltage and a wide band amplifier capable of amplifying such a voltage without distortion obviates any difficulty on this score. Any phase shift which might be present produces only a distortion of the square wave of the type illustrated in curve $a$ of Fig. 3, but does not appreciably shift the relative times of reversal of the square waves. The distortion of the flat top of the wave tends to reduce the average D. C. output current (curve $b$, Fig. 3) unless a large capacitor is connected across the motor. With an amplifier of reasonable bandwidth, however, the actual square wave will be preserved and the rectified output current will approximate the peak value of the wave, as shown in Figs. $2a$ and $2b$.

While the invention so far described has been illustrated by means of a control element which produces a control potential varying in polarity and amplitude as a function of the position of contact 9, it is to be understood that the control potential may be developed by any desired means and is not necessarily limited to a position responsive arrangement. Thus the control potential may be provided by a thermocouple which is responsive to temperature, or other arrangements which will be understood by those skilled in the art.

Further, it will be understood that the term "motor" is to be construed broadly, and includes any device whose output varies in sense in accordance with the reversal of the applied current. A zero-center meter or a relay are other devices which are illustrative of mechanisms of the type to be included within the meaning of this term.

The invention so far described has utility as a remote control follow-up device, but it may also be employed as a servo system in which information indicative of the position of the output device is referred back to the control element. To accomplish this, it is necessary to provide a differential device, illustrated in the present instance by a differential gear 49 connected between the load device 45 and a control arm 51, the movement of which controls the position of the output device. The positional difference between the control arm 51 and load device 45 is transmitted to the movable contact arm 9 in the conventional manner.

Assuming that the control arm 51 and the load device 45 are initially set in positional agreement and the contact arm 9 adjusted to the neutral or ground position, it will be observed that a stable condition will have been produced and the load will remain at rest. If, then, control arm 51 is turned to a new position, the resistance of the load will initially hold the output shaft 53 of the differential device stationary and this will cause contact arm 9 to move in one direction or the other a corresponding amount. This unbalances the system and causes the motor 31 to rotate, as described above, in the direction necessary to rotate the load device 41 to its new position. At the same time, the differential 49 transmits this motion to the contact arm 9 to restore it to its original position and to rebalance the system.

As indicated above, the reference potential need not necessarily be ground potential and an arrangement for providing a reference potential of any desired value is illustrated in Fig. 4, which shows only that portion of Fig. 1 which it is necessary to modify. An additional potentiometer 55 is connected across battery 5 or any other suitable source of D. C. potential, the contact arm of the potentiometer being connected to the lower fixed contact element 15 of switch 13. Preferably a large cupling capacitor 10 is included in the grid input circuit. The purpose of this capacitor is to make the grid of tube 17 independent of the value of the reference and input potentials, and responsive only to the square wave impulses resulting from their difference. It will now be seen that when equal voltages, whether positive, zero, or negative, are applied to the two fixed contacts 11 and 15 of switch 13, no alternating current will be produced and thus no torque developed by the motor. It may be desirable to operate the grid of amplifier 17 with a slightly positive or slightly negative fixed bias in order to locate the point of operation of amplifier tube 17 at the proper point of its grid voltage characteristic to insure uniform operation above and below the point of balance. The choice of this value will depend upon the type of tube employed. It is also evident that the adjustment of the reference potential may be used to effect the initial positional alignment of the control element and the output device.

In the arrangement illustrated in Fig. 1, a mechanical coupling is required between the control elements 9 and 51 and the output device 45 in order to insure positional agreement when the arrangement is used as a servo system. Since it is not always desirable to provide a mechanical connection between the control element and the load device, the arrangement illustrated in Fig. 5 may be preferred.

In this case the control element is the movable contact arm 9 of potentiometer 7, which is connected to fixed contact 11 of switch 13 as before. Since the amplifier circuit is identical to that illustrated in Fig. 1, it has not been shown in detail but is indicated by the dotted line 57. The output transformer 29 is connected through the second switch 33 to motor 31, as before. The motor is geared to the load device 45 adjacent to which is positioned a potentiometer 59 having its movable contact arm 60 coupled to the load so as to move or rotate in accordance with the position of the load. Potentiometer 59 is connected across a suitable source of D. C. potential provided by battery 61, one terminal of which is grounded. The movable contact arm is electrically connected to fixed contact 15 of the first switch, 13.

It is noted that in this case the negative terminals of batteries 5 and 61 are grounded. As a result, both the control voltage developed by potentiometer 7 and the reference voltage developed by potentiometer 59 will be positive. If desired, however, the positive terminals of both batteries may be grounded, in which case the control potential and the reference potential will both be negative. In any case, however, when the position of the load device is such that the reference potential is equal in value to the control potential, the system will be balanced and the motor will remain at rest. If the control element 9 be moved so as to increase the amplitude of the control potential, it will of course be positive with respect to the reference potential and an alternating voltage will be applied to the amplifier which will cause rotation of the motor in the manner described above. The circuit connections are made in such a manner that the rotation is in such a direction as to increase the amplitude of the reference potential. When the two are again equal, the system will be rebalanced and the motor will stop. Moving the control element 9 in such a direction as to decrease the control potential will, of course, make it negative with respect to the reference potential and the direction of rotation will be reversed and the system will move into positional agreement in the other direction to restore the balance.

It is to be understood that when the invention is employed as a servo system conventional auxiliary components may be added to the control potential for the purpose of overcoming hunting, positional lag, and other forms of dynamic or static positional disagreement. However, since such systems are well known and do not constitute a necessary element of the present invention, they have not been described or illustrated.

Referring now to Fig. 6, there is illustrated an alternative embodiment of this invention in which synchronous switching of the input and output circuits is accomplished by means of a single vibrating switch.

The D. C. control potential, as in the preceding cases, is derived from any suitable source illustrated by means of battery 5 and potentiometer 7. The movable contact 9 is connected through a high resistance 63 to one fixed contact 65 of a vibrating type single-pole double-throw switch 67. The same contact is coupled by means of capacitor 10 to the grid electrode of the first amplifier tube 69 which may be the first triode element of a twin tube of the 12AU7 type. Its cathode is grounded through a biasing resistor 71 and the grid may be connected to ground through grid resistor 73 which may be bypassed by a capacitor 75. The plate circuit is coupled by a coupling capacitor 77 to the grid of the second amplifier 79, the cathode of which is grounded. Plate voltage is applied to the two plate electrodes from a suitable positive potential source through resistors in the conventional manner. The plate of the second amplifier 79 is coupled to the output device 81 through a coupling capacitor 83. In the present instance the output device is shown as a zero center milliammeter or microammeter which may be used to indicate the relative polarity and amplitude of the control potential with respect to the reference potential. It is to be understood, however, that the output device may be a motor or similar device actuated by a D. C. current of reversible direction. The lower terminal of the output device 81 is grounded while its upper terminal is connected to the second fixed contact 85 of switch 67.

To explain the operation of this embodiment of the invention, assume that the movable arm of vibrator switch 67 has just moved from its upper to its lower position grounding contact 85, and that the contact arm 9 applies a small positive potential to the upper contact 65. A positive pulse will then be applied to the grid of the amplifier tube which will then cause the plate of the second amplifier tube 79 to become more positive and a charging current will flow through condenser 83 to ground. As the vibrator contact moves to its upper position, the input is grounded, removing the potential previously applied to the grid. At the same time, the plate of amplifier tube 79 becomes more negative and condenser 83 discharges through meter 81, causing it to deflect in a given direction. This cycle is repeated at the frequency of operation of the vibrator, alternate half cycles causing a current to flow in a given direction through the output device. This is effectively half wave rectification of the square wave input potential.

In case the contact arm 9 is moved to a point of negative potential, the meter 81 will be connected in the output circuit when capacitor 83 is charging and will be short-circuited when it is discharging. This causes a rectified current to flow through the meter in a direction which is opposite to that which actuated the meter under the previous condition. It will be apparent, therefore, that the direction of deflection of meter 81 depends on the relative polarity of the control potential with respect to ground and its amplitude depends on the relative amplitudes of the two potentials. It will therefore be seen that the principle of operation is similar to that of the preceding arrangements, but the apparatus has been greatly simplified.

It will be appreciated that where the output device produces mechanical motion responsive to the control potential, a feedback connection may be employed as in the case of Fig. 5, and the arrangement will function as a servo system.

In such a case the voltage produced by the feedback potentiometer (equivalent to potentiometer 59 of Fig. 5) would be inserted between ground and the top on battery 5, that is, in series with the means for producing a D. C. control potential obtained from any desired source. It should be noted also that the series-connection may also be employed, if desired, in the system of Fig. 5 by removing the ground from battery 5, and connecting the lead from arm 68 of potentiometer 59 to the previously grounded point, instead of to terminal 15 of relay 13 as shown.

What I claim is:

1. In a control system including means for producing a D.-C. potential variable in magnitude and polarity with respect to a reference potential means to subtract said D.-C. potential from said reference potential to obtain a difference potential, and a reversible D.-C. motor to be energized according to the polarity and magnitude of the said difference potential: an A.-C. amplifier, and means applying said difference potential to the input of said amplifier, means including a series capacitor applying the output of said amplifier to said motor, and a periodic switch comprising a single movable contact and two stationary contacts which are alternately engaged by said movable contact, said stationary contacts being connected respectively to said motor and to said input of said amplifier, and said movable contact being connected to a ground point common to said amplifier and said motor, whereby said switch device alternately short circuits said amplifier input and said motor, said capacitor being charged in accordance with said difference potential while said motor is short circuited and discharged through said motor while said amplifier input is short circuited.

2. In a system including means for producing a D.-C. control potential variable in magnitude and polarity with respect to a reference potential, means to derive the difference potential between said control and reference potentials, and a D.-C.

utilization device to be energized according to the polarity and magnitude of said difference potential: an A.-C. amplifier, and means applying said control potential to the input of said amplifier, means including a series capacitor applying the output of said amplifier to said utilization device, and means alternately short circuiting said amplifier input and said utilization device, said capacitor being charged in accordance with said control potential while said utilization device is short circuited and discharged through said utilization device while said amplifier input is short circuited.

3. A system for amplifying a D.-C. voltage whose magnitude and polarity may vary in accordance with the condition of a control element, comprising an A.-C. amplifier, means applying said voltage to the input of said amplifier, a load and means including a series capacitor applying the output of said amplifier to said load, and means alternately and periodically short circuiting said load and said amplifier input.

4. A D.-C. amplifier system including an A.-C. amplifier, a capacitor, a load connected to the output of said amplifier through said capacitor, and means alternately and periodically short circuiting said load and the input of said amplifier.

SIDNEY WALD.

REFERENCES CITED

The following references are of record in the file of this patent:

UNITED STATES PATENTS

| Number | Name | Date |
|---|---|---|
| 2,139,490 | Cooke | Dec. 6, 1938 |
| 2,150,006 | Parker et al. | Mar. 7, 1939 |
| 2,164,728 | Wey | July 4, 1939 |
| 2,275,317 | Ryder | Mar. 3, 1942 |
| 2,376,599 | Jones | May 22, 1945 |